(12) United States Patent
Meyerzon et al.

(10) Patent No.: US 7,761,448 B2
(45) Date of Patent: Jul. 20, 2010

(54) SYSTEM AND METHOD FOR RANKING SEARCH RESULTS USING CLICK DISTANCE

(75) Inventors: Dmitriy Meyerzon, Bellevue, WA (US); Hugo Zaragoza, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 401 days.

(21) Appl. No.: 10/955,983

(22) Filed: Sep. 30, 2004

(65) Prior Publication Data

US 2006/0074903 A1 Apr. 6, 2006

(51) Int. Cl.
*G06F 17/30* (2006.01)

(52) U.S. Cl. .......................... 707/731; 707/752; 704/1; 715/255

(58) Field of Classification Search .......... None
See application file for complete search history.

(56) References Cited

U.S. PATENT DOCUMENTS

| | | | |
|---|---|---|---|
| 5,222,236 A | 6/1993 | Potash et al. | |
| 5,257,577 A | 11/1993 | Clark | |
| 5,594,660 A | 1/1997 | Sung et al. | |
| 5,606,609 A | 2/1997 | Houser et al. | |
| 5,848,404 A * | 12/1998 | Hafner et al. | 707/3 |
| 5,893,092 A | 4/1999 | Driscoll | |
| 5,920,859 A | 7/1999 | Li | 707/5 |
| 5,933,851 A | 8/1999 | Kojima | |
| 5,960,383 A | 9/1999 | Fleisher | |
| 5,983,216 A | 11/1999 | Kirsch et al. | |
| 5,987,457 A | 11/1999 | Ballard | |
| 6,006,225 A | 12/1999 | Bowman et al. | |
| 6,012,053 A | 1/2000 | Pant et al. | |
| 6,032,196 A | 2/2000 | Monier | |
| 6,041,323 A | 3/2000 | Kubota | |
| 6,070,158 A | 5/2000 | Kirsch et al. | |
| 6,070,191 A | 5/2000 | Narendran et al. | |
| 6,098,064 A | 8/2000 | Pirolli et al. | |
| 6,125,361 A | 9/2000 | Chakrabarti et al. | |
| 6,128,701 A | 10/2000 | Malcolm et al. | |
| 6,145,003 A | 11/2000 | Sanu et al. | |

(Continued)

FOREIGN PATENT DOCUMENTS

DE 10029644 A1 1/2002

(Continued)

OTHER PUBLICATIONS

Marc Najork et al, "Breadth-First Crawling Yields High-Quality Pages", ACM, Compaq Systems Research Center, Hong Kong, 2001, pp. 114-118.*

(Continued)

*Primary Examiner*—Apu M Mofiz
*Assistant Examiner*—Hung D Le
(74) *Attorney, Agent, or Firm*—Merchant & Gould P.C.

(57) ABSTRACT

Search results of a search query on a network are ranked according to an additional click distance property associated with each of the documents on the network. The click distance is measurement of the number clicks or user navigations from a page or pages on the network designated as highest authority or root pages on the network. The precision of the results is increased by the addition of the click distance term when the site or intranet where the search query takes place is hierarchically structured.

20 Claims, 6 Drawing Sheets

U.S. PATENT DOCUMENTS

| | | | |
|---|---|---|---|
| 6,151,624 A | 11/2000 | Teare et al. ............... 709/217 |
| 6,167,369 A | 12/2000 | Schulze |
| 6,182,085 B1 | 1/2001 | Eichstaedt et al. |
| 6,182,113 B1 | 1/2001 | Narayanaswami ......... 709/203 |
| 6,185,558 B1 | 2/2001 | Bowman et al. |
| 6,202,058 B1 | 3/2001 | Rose et al. |
| 6,208,988 B1 | 3/2001 | Schultz |
| 6,216,123 B1 | 4/2001 | Robertson et al. |
| 6,222,559 B1 | 4/2001 | Asano et al. ............... 345/440 |
| 6,240,407 B1 | 5/2001 | Chang et al. |
| 6,240,408 B1 | 5/2001 | Kaufman |
| 6,247,013 B1 | 6/2001 | Morimoto ................... 707/10 |
| 6,263,364 B1 | 7/2001 | Najork et al. |
| 6,285,367 B1 | 9/2001 | Abrams et al. ............. 345/357 |
| 6,285,999 B1 | 9/2001 | Page |
| 6,304,864 B1 | 10/2001 | Liddy et al. |
| 6,317,741 B1 | 11/2001 | Burrows |
| 6,327,590 B1 | 12/2001 | Chidlovskii |
| 6,349,308 B1 | 2/2002 | Whang et al. ............... 707/107 |
| 6,351,467 B1 | 2/2002 | Dillon |
| 6,351,755 B1 | 2/2002 | Najork et al. |
| 6,360,215 B1 | 3/2002 | Judd et al. |
| 6,385,602 B1 | 5/2002 | Tso et al. |
| 6,389,436 B1 | 5/2002 | Chakrabarti et al. |
| 6,418,433 B1 | 7/2002 | Chakrabarti et al. |
| 6,418,452 B1 | 7/2002 | Kraft et al. |
| 6,418,453 B1 | 7/2002 | Kraft et al. |
| 6,442,606 B1 | 8/2002 | Subbaroyan et al. |
| 6,473,752 B1 | 10/2002 | Fleming |
| 6,484,204 B1 * | 11/2002 | Rabinovich ................ 709/226 |
| 6,516,312 B1 | 2/2003 | Kraft et al. ..................... 707/3 |
| 6,539,376 B1 | 3/2003 | Sundaresan et al. |
| 6,546,388 B1 | 4/2003 | Edlund et al. |
| 6,547,829 B1 | 4/2003 | Meyerzon et al. |
| 6,549,896 B1 | 4/2003 | Candan et al. |
| 6,549,897 B1 | 4/2003 | Katariya et al. |
| 6,594,682 B2 | 7/2003 | Peterson et al. |
| 6,598,047 B1 | 7/2003 | Russell et al. |
| 6,598,051 B1 | 7/2003 | Wiener et al. |
| 6,601,075 B1 | 7/2003 | Huang et al. ............. 707/104.1 |
| 6,622,140 B1 | 9/2003 | Kantrowitz |
| 6,628,304 B2 | 9/2003 | Mitchell et al. ............. 345/734 |
| 6,633,867 B1 | 10/2003 | Kraft et al. ..................... 707/3 |
| 6,633,868 B1 | 10/2003 | Min |
| 6,636,853 B1 * | 10/2003 | Stephens, Jr. ................. 707/10 |
| 6,638,314 B1 | 10/2003 | Meyerzon et al. |
| 6,671,683 B2 | 12/2003 | Kanno |
| 6,701,318 B2 | 3/2004 | Fox et al. |
| 6,718,324 B2 | 4/2004 | Edlund et al. |
| 6,718,365 B1 | 4/2004 | Dutta |
| 6,738,764 B2 | 5/2004 | Mao et al. |
| 6,763,362 B2 | 7/2004 | McKeeth ................. 707/104.1 |
| 6,766,316 B2 | 7/2004 | Caudill et al. |
| 6,766,422 B2 | 7/2004 | Beyda |
| 6,775,659 B2 | 8/2004 | Clifton-Bligh ................ 707/1 |
| 6,775,664 B2 | 8/2004 | Lang et al. |
| 6,778,997 B2 | 8/2004 | Sundaresan et al. |
| 6,829,606 B2 | 12/2004 | Ripley |
| 6,859,800 B1 | 2/2005 | Roche et al. |
| 6,862,710 B1 | 3/2005 | Marchisio ................. 715/501.1 |
| 6,871,202 B2 * | 3/2005 | Broder .......................... 707/7 |
| 6,883,135 B1 | 4/2005 | Obata et al. |
| 6,886,010 B2 | 4/2005 | Kostoff |
| 6,886,129 B1 | 4/2005 | Raghavan et al. ......... 715/501.1 |
| 6,910,029 B1 | 6/2005 | Sundaresan |
| 6,931,397 B1 | 8/2005 | Sundaresan .................... 707/5 |
| 6,934,714 B2 | 8/2005 | Meinig ....................... 707/102 |
| 6,944,609 B2 | 9/2005 | Witbrock |
| 6,947,930 B2 | 9/2005 | Anick et al. ................... 707/5 |
| 6,959,326 B1 | 10/2005 | Day et al. .................... 709/217 |
| 6,973,490 B1 | 12/2005 | Robertson et al. |
| 6,990,628 B1 | 1/2006 | Palmer et al. |
| 7,016,540 B1 | 3/2006 | Gong et al. |
| 7,028,029 B2 | 4/2006 | Kamvar et al. |
| 7,039,234 B2 | 5/2006 | Geidl et al. |
| 7,051,023 B2 | 5/2006 | Kapur et al. |
| 7,072,888 B1 | 7/2006 | Perkins |
| 7,076,483 B2 * | 7/2006 | Preda et al. ..................... 707/5 |
| 7,080,073 B1 | 7/2006 | Jiang et al. |
| 7,107,218 B1 | 9/2006 | Preston |
| 7,152,059 B2 | 12/2006 | Monteverde |
| 7,181,438 B1 | 2/2007 | Szabo |
| 7,197,497 B2 | 3/2007 | Cossock |
| 7,228,301 B2 | 6/2007 | Meyerzon et al. |
| 7,231,399 B1 | 6/2007 | Bern et al. |
| 7,243,102 B1 | 7/2007 | Naam et al. |
| 7,246,128 B2 * | 7/2007 | Jordahl ....................... 707/100 |
| 7,257,574 B2 | 8/2007 | Parikh |
| 7,257,577 B2 | 8/2007 | Fagin et al. |
| 7,260,573 B1 | 8/2007 | Jeh et al. |
| 7,281,002 B2 | 10/2007 | Farrell |
| 7,308,643 B1 | 12/2007 | Zhu et al. |
| 7,328,401 B2 | 2/2008 | Obata et al. |
| 7,346,604 B1 | 3/2008 | Bharat et al. |
| 7,356,530 B2 | 4/2008 | Kim et al. |
| 7,386,527 B2 | 6/2008 | Harris et al. |
| 7,428,530 B2 | 9/2008 | Ramarathnam et al. |
| 7,519,529 B1 | 4/2009 | Horvitz |
| 2001/0042076 A1 | 11/2001 | Fukuda ....................... 707/500 |
| 2002/0055940 A1 | 5/2002 | Elkan |
| 2002/0062323 A1 | 5/2002 | Takatori et al. |
| 2002/0078045 A1 | 6/2002 | Dutta |
| 2002/0099694 A1 | 7/2002 | Diamond et al. |
| 2002/0102798 A1 | 8/2002 | Mani et al. |
| 2002/0103798 A1 | 8/2002 | Abrol et al. |
| 2002/0107861 A1 | 8/2002 | Clendinning et al. ........ 77/101 |
| 2002/0107886 A1 | 8/2002 | Gentner et al. |
| 2002/0129014 A1 | 9/2002 | Kim et al. |
| 2002/0169595 A1 | 11/2002 | Agichtein et al. ............... 704/9 |
| 2002/0169770 A1 | 11/2002 | Kim et al. ........................ 707/5 |
| 2003/0037074 A1 | 2/2003 | Dwork et al. |
| 2003/0053084 A1 | 3/2003 | Geidl et al. |
| 2003/0055810 A1 | 3/2003 | Cragun et al. |
| 2003/0061201 A1 | 3/2003 | Grefenstette et al. |
| 2003/0065706 A1 | 4/2003 | Smyth et al. |
| 2003/0074368 A1 | 4/2003 | Schuetze et al. |
| 2003/0208482 A1 | 11/2003 | Kim et al. ....................... 707/3 |
| 2003/0217007 A1 | 11/2003 | Fukushima et al. |
| 2003/0217047 A1 | 11/2003 | Marchisio |
| 2003/0217052 A1 | 11/2003 | Rubenczyk et al. |
| 2004/0003028 A1 | 1/2004 | Emmett et al. |
| 2004/0006559 A1 | 1/2004 | Gange et al. |
| 2004/0049766 A1 | 3/2004 | Bloch et al. ................ 717/121 |
| 2004/0093328 A1 * | 5/2004 | Damle ........................... 707/3 |
| 2004/0111408 A1 | 6/2004 | Caudill et al. |
| 2004/0117351 A1 | 6/2004 | Challapalli et al. ............. 707/2 |
| 2004/0148278 A1 | 7/2004 | Milo et al. |
| 2004/0181515 A1 | 9/2004 | Ullmann et al. |
| 2004/0186827 A1 | 9/2004 | Anick et al. .................... 707/3 |
| 2004/0194099 A1 | 9/2004 | Lamping et al. |
| 2004/0199497 A1 | 10/2004 | Timmons |
| 2004/0205497 A1 | 10/2004 | Alexander et al. |
| 2004/0215606 A1 * | 10/2004 | Cossock ......................... 707/3 |
| 2004/0215664 A1 | 10/2004 | Hennings et al. ......... 707/104.1 |
| 2004/0254932 A1 | 12/2004 | Gupta et al. |
| 2005/0033742 A1 * | 2/2005 | Kamvar et al. .................. 707/7 |
| 2005/0044071 A1 | 2/2005 | Cho et al. |
| 2005/0055340 A1 | 3/2005 | Dresden |
| 2005/0055347 A9 | 3/2005 | Cho et al. |
| 2005/0060186 A1 | 3/2005 | Blowers et al. |
| 2005/0060304 A1 | 3/2005 | Parikh |
| 2005/0060311 A1 | 3/2005 | Tong et al. |
| 2005/0071328 A1 | 3/2005 | Lawrence |
| 2005/0071741 A1 | 3/2005 | Acharya et al. |

| | | | |
|---|---|---|---|
| 2005/0086192 | A1 | 4/2005 | Kodama |
| 2005/0086206 | A1 | 4/2005 | Balasubramanian |
| 2005/0086583 | A1 | 4/2005 | Obata et al. |
| 2005/0144162 | A1 | 6/2005 | Liang |
| 2005/0154746 | A1 | 7/2005 | Liu et al. |
| 2005/0165781 | A1 | 7/2005 | Kraft et al. |
| 2005/0187965 | A1 | 8/2005 | Abajian |
| 2005/0192936 | A1 | 9/2005 | Meek et al. |
| 2005/0192955 | A1* | 9/2005 | Farrell ........................ 707/5 |
| 2005/0210006 | A1 | 9/2005 | Robertson |
| 2005/0216533 | A1 | 9/2005 | Berkhin |
| 2005/0240580 | A1 | 10/2005 | Zamir et al. |
| 2005/0251499 | A1 | 11/2005 | Huang |
| 2005/0262050 | A1* | 11/2005 | Fagin et al. ................... 707/3 |
| 2005/0283473 | A1 | 12/2005 | Rousso et al. |
| 2006/0036598 | A1* | 2/2006 | Wu ............................. 707/5 |
| 2006/0047649 | A1* | 3/2006 | Liang .......................... 707/4 |
| 2006/0069982 | A1 | 3/2006 | Petriuc |
| 2006/0161534 | A1 | 7/2006 | Carson et al. |
| 2006/0173560 | A1 | 8/2006 | Widrow |
| 2006/0195440 | A1 | 8/2006 | Burges et al. |
| 2006/0206460 | A1 | 9/2006 | Gadkari et al. |
| 2006/0206476 | A1 | 9/2006 | Kapur et al. |
| 2006/0282455 | A1 | 12/2006 | Lee et al. |
| 2006/0287993 | A1 | 12/2006 | Yao et al. |
| 2007/0038616 | A1 | 2/2007 | Guha |
| 2007/0038622 | A1 | 2/2007 | Meyerzon et al. |
| 2007/0073748 | A1 | 3/2007 | Barney |
| 2007/0106659 | A1 | 5/2007 | Lu et al. |
| 2007/0150473 | A1 | 6/2007 | Li et al. |
| 2007/0198459 | A1 | 8/2007 | Boone et al. |
| 2007/0276829 | A1 | 11/2007 | Wang et al. |

FOREIGN PATENT DOCUMENTS

| | | |
|---|---|---|
| EP | 0 950 961 | 10/1999 |
| EP | 1050830 A2 | 11/2000 |
| EP | 1120717 A2 | 8/2001 |
| EP | 1282060 | 2/2002 |
| EP | 1557770 | 7/2005 |
| JP | 10091638 | 4/1998 |
| JP | 11328191 | 11/1999 |
| JP | 2002-091843 | 3/2002 |
| JP | 2003-248696 | 9/2003 |
| KR | 10-2002-0015838 A | 3/2002 |
| KR | 10-2003-0081209 A | 10/2003 |
| KR | 10-2006-0116042 A | 11/2006 |

OTHER PUBLICATIONS

Michael Chen et al, Cha Cha: A System for Organizing Intranet Search Results, Computer Science Department, University of California, Berkeley, 1999, p. 1-12).*

Jon M. Kleinberg, "Authoritative Sources in a Hyperliinked Environment", Proceedings of the aCM-SIAM symposium on Discrete Algorithms, 1998.*

Hsinchun Chen et al, "A Smart Itsy Bitsy Spider for the Web", Journal of the American Society for Information Science, 49(7), pp. 604-618, 1998.*

Hiemstra, D. et al., "Relevance Feedback for Best Match Term Weighting Algorithms in Information Retrieval", Proceedings of the Joint DELOS-NSF Workshop on Personalisation and Recommender Systems in Digital Libraries, ERCIM Workshop Proceedings 01/W03, pp. 37-42, Jun. 2001.

Brin, S. et al., "The Anatomy of a Large-Scale Hypertextual Web Search Engine", In Proceedings of the 7th International World Wide Web Conference, Brisbane, Australia, pp. 107-117, 1998.

Eiron, N. et al., "Analysis of Anchor Text for Web Search", Proceedings of the 26th Annual International ACM SIGIR Conference on Research and Development in Information Retrieval, Jul. 28-Aug. 1, 2003, Toronto, Canada, 8 pgs.

Manning, C. et al., "CS276A Text Information Retrieval, Mining, and Exploitation: Lecture 12", Stanford University CS276A/ SYMBSYS2391/LING2391 Test Information Retrieval, Mining, and Exploitation, Fall 2002, last modified Nov. 18, 2002, 8 pgs.

Jones, K. et al., "A probabilistic model of information retrieval: development and status", Department of Information Science, City University, London, Aug. 1998, 74 pgs.

Numerico, T., "Search engines organization of information and Web Topology", http://www.cafm.lsbu.ac.uk/eminars/sse/numerico-6-dec-2004.pdf, Dec. 6, 2004, 32 pgs.

Zamir, O. et al., "Grouper: A Dynamic Clustering Interface to Web Search Results", Computer Networks (Amsterdam, Netherlands: 1999), 31(11-16): 1361-1374, 1999.

Losee, R. et al., "Research in Information Organization", Literature Review, School of Information and Library Science, Section 4, pp. 53-96, Jan. 2001.

Fagin, R. et al., "Searching the Workplace Web", IBM Almaden Research Center, In Proceedings of the Twelfth International World Wide Web Conference, Budapest, 2003, 21 pgs.

Carmel, D. et al., "Searching XML Documents Via XML Fragments", SIGIR Toronto, Canada, Jul.-Aug. 2003, pp. 151-158.

Craswell, N. et al., "TREC12 Web Track as CSIRO", TREC 12, Nov. 2003, 11 pp.

Cutler, M. et al., "A New Study on Using HTML Structures to Improve Retrieval", 11th IEEE International Conference on Chicago, IL, Nov. 9-11, 1999, pp. 406-409.

Hawking, D. et al., "Overview of the TREC-8 Web Track", TREC, Feb. 2000, pp. 1-18.

Hawking, D., "Overview of the TREC-9 Track", TREC, 2000, pp. 1-16.

Hawking., D. et al., "Overview of TREC-7 Very Large Collection Track", TREC, Jan. 1999, pp. 1-13.

Heery, Rachel, "Review of Metadata Formats", Program, vol. 30, No. 4, Oct. 1996, 1996 IEEE, pp. 345-373.

Kotsakis, E., "Structured Information Retrieval in XML Documents", Proceedings of the ACM Symposium on Applied Computing, Madrid, Spain, 2002, pp. 663-667.

Kucuk, Mehmet Emin, et al., "Application of Metadata Concepts to Discovery of Internet Resources", ADVIS 2000, INCS 1909, pp. 304-313, 2000.

Lalmas, M., "Uniform Representation of Content and Structure for Structured Document Retrieval", $20^{th}$ SGES International Conference on Knowledge Based Systems and Applied Artificial Intelligence, Cambridge, UK, Dec. 2000, pp. 1-12.

Larkey, Leah S., et al., "Collection Selection and Results Merging with Topically Organized U.S. Patents and TREC Data", Proceedings of the Ninth International Conference on Information Knowledge Management, CIKM 2000, Nov. 6-11, 2000, pp. 282-289.

Nelson, Chris, "Use of Metadata Registries for Searching for Statistical Data", IEEE 2002, Dimension EDI Ltd., pp. 232-235, 2002.

Ogilvie, P. et al., "Combining Document Representations for Known-Item Search", Proceedings of the $26^{th}$ Annual International ACM SIGIR Conference on Research and Development in Information Retrieval, Toronto, Canada, 2003, pp. 143-150.

Robertson, S. et al., "Okapi at TREC-4", 1996, 24 pp.

Robertson, S. et al., "Some Simple Effective Approximations to the 2-Poisson Model for Probabilistic Weighted Retrieval", Proceedings of the $17^{th}$ Annual International ACM SIGIR Conference on Research and Development in Information Retrieval, 1994, pp. 232-241.

Schulz, Stefan, et al., "Indexing Medical WWW Documents by Morphemes", MEDINFO 2001 Proceedings of the $10^{th}$ World Congress on Medical Informatics, Park I, IOS Press, Inc., pp. 266-270, 2001.

Singhal, A. et al., "AT&T at TREC-9", Proceedings of the Ninth Text Retrieval Conference, NIST Special Publication 500-249, 'Online! 2001, pp. 103-105.

Sturdy, Derek, "Squirrels and nuts: metadata and knowledge management", Business Information Review, 18(4), pp. 34-42, Dec. 2001.

Voorhees, E., "Overview of TREC 2002", Gaithersburg, Maryland, Nov. 19-22, 15 pp.

Web Page "Reuters: Reuters Corpus", http://about.reuter.com/researchandstandards/corpus/, viewed Mar. 18, 2004.

Westerveld, T. et al., "Retrieving Web pages using Content, Links, URLs and Anchors", Proceedings of the Tenth Text Retrieval Conference, NIST Special Publication, 'Online! Oct. 2001, pp. 1-10.

Wilkinson, R., "Effective Retrieval of Structured Documents", Annual ACM Conference on Research and Development, 1994, 7 pp.

Yi, Jeonghe,e et al., "Metadata Based Web Mining for Topic-Specific Information Gathering", IEEE, pp. 359-368, 2000.

Yi, Jeonghee, et al., "Using Metadata to Enhance Web Information Gathering", D.Suciu and G. Vossen (eds.): WebDB 2000, LNCS 1997, pp. 38-57, 2001.

"Microsoft SharePoint Portal Server 2001 Resource Kit: Chapter 24, Analyzing the Default Query for the Dashboard", http://www.microsoft.com/technet/prodtechnol/sppt/sharepoint/reskit/part5/c24spprk.mspx, printed on May 22, 2006, 5 pp.

"Microsoft Full-Text Search Technologies", http://www.microsoft.com/technet/prodtechnol/sppt/sharepoint/evaluate/featfunc/ms-searc..., published on Jun. 1, 2001, printed on May 22, 2006, 13 pp.

"Microsoft External Content in Microsoft Office SharePoint Portal Server 2003", http://www.microsoft.com/technet/prodtechnol/sppt/reskit/c2261881x.mspx, published on Jun. 9, 2004, printed on May 22, 2006, 20 pp.

"Planning Your Information Structure Using Microsoft Office SharePoint Portal Server 2003", http://www.microsoft.com/technet/prodtechnol/sppt/reskit/c0861881x.mspx, published on Jun. 9, 2004, printed on May 22, 2006, 22 pp.

Bandinelli, Luca, "Using Microsoft SharePoint Products and Technologies in Multilingual Scenarios", http://www.microsoft.com/technet/prodtechnol/office/sps2003/maintain/spmultil.mspx, published on Nov. 1, 2003, printed on May 22, 2006, 32 pp.

"SharePoint Portal Server 2001 Planning and Installation Guide", http://www.microsoft.com/technet/prodtechnol/sppt/sharepoint/plan/planinst.mspx, printed on May 22, 2006, 86 pp.

U.S. Appl. No. 11/019,091, filed Dec. 21, 2004 entitled "Ranking Search Results Using Feature Extraction".

U.S. Appl. No. 11/073,381, filed Mar. 3, 2005 entitled "System and Method for Ranking Search Results Using File Types".

U.S. Appl. No. 10/804,326, filed Mar. 18, 2004 entitled "Field Weighting in Text Document Searching".

U.S. Appl. No. 10/609,315, filed Jun. 27, 2003, entitled "Normalizing Document Metadata Using Directory Services".

U.S. Appl. No. 11/238,906, filed Sep. 29, 2005 entitled "Click Distance Determination".

U.S. Appl. No. 11/412,723, filed Apr. 26, 2006, entitled "Ranking Search Results Using Language Types".

U.S. Appl. No. 10/955,462, filed Sep. 30, 2004 entitled "System and Method for Incorporating Anchor Text Into Ranking Search Results".

Official Action in U.S. Appl. No. 10/609,315 mailed Dec. 15, 2005.

Official Action in U.S. Appl. No. 10/609,315 mailed Jun. 1, 2006.

Barry Smyth, Relevance at a Distance—An Investigation of Distance-Biased Personalization in the Mobile Internet, pp. 1-6.

Sylvain Senecal, Consumers' decision-making process and their online shopping behavior: a clickstream analysis, Jun. 1, 2004, pp. 1600-1607.

Ronald Fagin, Searching the Workplace Web, Mar. 3, 2005, pp. 1-10.

JI-Rong Wen, Query Clustering using user Logs, Jan. 2002, pp. 59-81.

Cho et al., "Efficient Crawling Through URL Ordering", In Proceedings of the 7th International World Wide Web Conference, Apr. 1998, pp. 161-180.

Chakrabarti, S., "Recent Results in Automatic Web Resource Discovery", ACM Computing Surveys, vol. 31, No. 4es, Dec. 1999, pp. 1-7.

Lam et al., "Automatic Document Classification Based on Probabilistic Reasoning: Model and Performance Analysis", IEEE, 1997, pp. 2719-2723.

Lee, J.K.W. et al., "Intelligent Agents for Matching Information Providers and Consumers on the World-Wide Web", IEEE, 1997, pp. 189-199.

Huang et al., "Design and Implementation of a Chinese Full-Text Retrieval System Based on Probabilistic Model", IEEE, 1993, pp. 1090-1093.

Yuwono, Budi and Lee, Dik L., "Search and Ranking Algorithms for Locating Resources on the World Wide Web", IEEE, 1996, pp. 164-170.

U.S. Official Action in U.S. Appl. No. 10/609,315 mailed Dec. 15, 2005.

U.S. Official Action in U.S. Appl. No. 10/981,962 mailed Apr. 5, 2006.

U.S. Official Action in U.S. Appl. No. 10/609,315 mailed Jun. 1, 2006.

U.S. Official Action in U.S. Appl. No. 10/981,962 mailed Sep. 21, 2006.

U.S. Official Action in U.S. Appl. No. 10/804,326 mailed Oct. 16, 2006.

U.S. Official Action in U.S. Appl. No. 10/955,462 mailed Nov. 3, 2006.

U.S. Official Action in U.S. Appl. No. 10/981,962 mailed Apr. 30, 2007.

U.S. Official Action in U.S. Appl. No. 10/955,462 mailed May 11, 2007.

U.S. Official Action in U.S. Appl. No. 10/804,326 mailed Jun. 7, 2007.

U.S. Official Action in U.S. Appl. No. 11/019,091 mailed Jun. 20, 2007.

U.S. Official Action in U.S. Appl. No. 10/955,462 mailed Sep. 10, 2007.

U.S. Official Action in U.S. Appl. No. 11/073,381 mailed Sep. 18, 2007.

U.S. Official Action in U.S. Appl. No. 10/804,326 mailed Dec. 11, 2007.

U.S. Official Action in U.S. Appl. No. 11/238,906 mailed Jan. 8, 2008.

U.S. Official Action in U.S. Appl. No. 10/981,962 mailed Mar. 17, 2008.

U.S. Official Action in U.S. Appl. No. 11/412,723 mailed May 28, 2008.

U.S. Official Action in U.S. Appl. No. 11/019,091 mailed Apr. 3, 2008.

U.S. Official Action in U.S. Appl. No. 11/073,381 mailed Jul. 10, 2008.

U.S. Official Action in U.S. Appl. No. 11/206,286 mailed Jul. 14, 2008.

U.S. Official Action in U.S. Appl. No. 11/238,906 mailed Sep. 16, 2008.

EP Search Report in EP 00309121 mailed Jul. 18, 2002.

EP Exam Report in EP 00309121.2-522 mailed Jul. 4, 2003.

EP Exam Report in EP 00309121.2-1527 mailed Jun. 16, 2004.

EP Search Report in EP 05105048 mailed Jan. 17, 2006.

EP Exam Report in EP 00309121.2-1527 mailed Feb. 8, 2007.

U.S. Official Action in U.S. Appl. No. 11/073,381 mailed Apr. 15, 2009.

U.S. Official Action in U.S. Appl. No. 11/238,906 mailed May 19, 2009.

PCT Search Report in PCT/US2008/011894 mailed Feb. 27, 2009.

Chinese Decision on Rejection in 200510088213.5 mailed Mar. 6, 2009.

U.S. Appl. No. 09/493,748, filed Jan. 28, 2000 entitled "Adaptive Web Crawling Using a Statistical Model."

U.S. Appl. No. 11/874,844, filed Oct. 18, 2007 entitled "Enterprise Relevancy Ranking Using a Neural Network."

U.S. Appl. No. 11/874,579, filed Oct. 18, 2007 entitled "Ranking and Providing Search Results Based in Part on a Number of Click-Through Features."

U.S. Appl. No. 12/207,910, filed Sep. 10, 2008 entitled "Document Length as a Static Relevance Feature for Ranking Search Results."

Agichten et al., "Improving Web Search Ranking by Incorporating User Behavior Information"—http://www.mathcs.emory.edu/~eugene/papers/sigir2006ranking.pdf, 8 pp.

Taylor et al., "Optimisation Methods for Ranking Functions with Multiple Parameters"—http://delivery.acm.org/10.1145/1190000/1183698/p585-taylor.pdf?key1=1183698&key2=3677533811&coll=GUIDE&dl=GUIDE&CFID=22810237&CFTOKEN=34449120, Nov. 5-11, 2006, pp. 585-593.

Burges, Christopher J.C. et al., "Learning to Rank with Nonsmooth Cost Functions"—http://books.nips.cc/papers/txt/nips19/NIPS2006_0574.txt, 2 pages.

Filip Radlinski, et al.,, "Query Chains: Learning to Rank from Implicit Feedback," http://delivery.acm.org/10.1145/1090000/1081899/p239-radlinski.pdf?key1=1081899&key2=3628533811&coll=GUIDE& CFID=27212902&CFTOKEN=53118399, KDD'05, Chicago, IL, Aug. 21-24, 2005, 10 pages.

Irina Matveeva, et al., "High Accuracy Retrieval with Multiple Nested Ranker," http://people.cs.uchicago.edu/~matveeva/RankerSIGIR06.pdf, SIGIR'06, Seattle, WA Aug. 6-11, 2006, 8 pages.

Gui-Rong Xue, et al., "Optimizing Web Search Using Web Click-Through Data," http://people.cs.vt.edu/~xwensi/Publication/p118-xue.pdf, CIKM'04, Nov. 8-13, 2004, 9 pages.

Losee, Robert M. et al., "Measuring Search Engine Quality and Query Difficulty: Ranking with Target and Freestyle," http://ils.unc.edu/~losee/paril.pdf, Journal of the American Society for Information Science, Jul. 29, 1999, 20 pages.

Ljosland, Mildrid, "Evaluation of Web Search Engines and the Search for Better Ranking Algorithms," http://www.aitel.hist.no/~mildrid/dring/paper/SIGIR.html, SIGIR99 Workshop on Evaluation of Reb Retrieval, Aug. 19, 1999, 5 pages.

Shamsfard, Mehrnoush, et al., "ORank: An Ontology Based System for Ranking Documents," http://www.waset.org/ijcs/v1/v1-3-30.pdf, International Journal of Computer Science, vol. 1, No. 3, Apr. 10, 2006, pp. 225-231.

MSDN, "Understanding Ranking," http://msdn.microsoft.com/en-us/library/ms142524.aspx, Sep. 2007, 4 pages.

Microsoft SharePoint Portal Server 2001 White Paper, "Microsoft SharePoint Portal Server: Advanced Technologies for Information Search and Retrieval," http://download.microsoft.com/download/3/7/a/37a762d7-dbe6-4b51-a6ec-f6136f44fd65/SPS_Search.doc, Jun. 2002, 12 pages.

U.S. Official Action in U.S. Appl. No. 10/955,983 mailed Jul. 21, 2008.

U.S. Official Action in U.S. Appl. No. 10/804,326 mailed Dec. 10, 2008.

U.S. Official Action in U.S. Appl. No. 11/019,091 mailed Dec. 11, 2008.

U.S. Official Action in U.S. Appl. No. 10/955,983 mailed Dec. 18, 2008.

U.S. Official Action in U.S. Appl. No. 11/206,286 mailed Dec. 24, 2008.

EP Search Report in EP 05105110 dated Aug. 11, 2006.

PCT Search Report in PCT/US2006/031965 mailed Jan. 11, 2007.

EP Exam Report in EP 05105048.2-2201 mailed Apr. 23, 2007.

Chinese First Official Action in 200510088527.5 mailed Apr. 18, 2008.

Chinese First Official Action in 200510088213.5 mailed May 9, 2008.

Chinese Second Official Action in 200510088213.5 mailed Oct. 10, 2008.

Chinese Second Official Action in 200510088527.5 mailed Dec. 26, 2008.

U.S. Official Action in U.S. Appl. No. 11/412,723 mailed Mar. 6, 2009.

U.S. Official Action in U.S. Appl. No. 11/019,091 mailed Sep. 1, 2009.

U.S. Official Action in U.S. Appl. No. 11/412,723 mailed Sep. 3, 2009.

U.S. Official Action in U.S. Appl. No. 11/073,381 mailed Sep. 29, 2009.

Chinese First Official Action in 200680029645.1 mailed Jun. 19, 2009.

Chinese First Official Action in 200680035828.4 mailed Jun. 19, 2009.

Chinese Third Official Action in 200510088213.5 mailed Sep. 4, 2009.

Japanese Notice of Rejection in 2008-527094 mailed Sep. 11, 2009.

US Official Action in U.S. Appl. No. 11/874,844, mailed on Nov. 13, 2009.

US Official Action in U.S. Appl. No. 11/238,906 mailed Dec. 18, 2009.

Japanese Final Rejection in 2008-527094 mailed Jan. 22, 2010.

Egyptian Official Action in PCT 269/2008 mailed Feb. 1, 2010.

US Official Action in U.S. Appl. No. 11/412,723 mailed Mar. 11, 2010.

Fagin, R. et al., "Searching the Workplace Web", May 20, 2003, Retrieved from the Internet: www.almaden.ibm.comics/people/fagin/www03.pdf [retrieved on 2006-07-27].

US Official Action in U.S. Appl. No. 11/073,381 mailed Apr. 12, 2010.

Chinese Second Office Action in Chinese Application No. 200680029645.1 mailed Apr. 6, 2010.

* cited by examiner

SYSTEM AND METHOD FOR RANKING SEARCH RESULTS USING CLICK DISTANCE

CROSS-REFERENCE TO RELATED APPLICATIONS

The present invention is related to a patent application having Ser. No. 10/955,462, entitled: "System and Method for Incorporating Anchor Text into Ranking Search Results", filed concurrently with this application. The present invention is also related to a patent application having Ser. No. 10/804, 326, entitled "Field Weighting in Text Document Searching", filed on Mar. 18, 2004. The related applications are assigned to the assignee of the present patent application and are hereby incorporated by reference.

BACKGROUND OF THE INVENTION

In a text document search, a user typically enters a query into a search engine. The search engine evaluates the query against a database of indexed documents and returns a ranked list of documents that best satisfy the query. A score, representing a measure of how well the document satisfies the query, is algorithmically generated by the search engine. Commonly-used scoring algorithms rely on splitting the query up into search terms and using statistical information about the occurrence of individual terms in the body of text documents to be searched. The documents are listed in rank order according to their corresponding scores so the user can see the best matching search results at the top of the search results list.

Another evaluation that certain search engines may employ to improve the quality of the results is to modify the rank of the results by a selected ranking function. One exemplary prior art ranking function determines that when one page links to another page, it is effectively casting a vote for the other page. The more votes that are cast for a page, the more important the page. The ranking function can also take into account who cast the vote. The more important the page, the more important their vote. These votes are accumulated and used as a component of the ratings of the pages on the network.

A ranking function is used to improve the quality of the ranking. However, the effectiveness of the ranking function may be affected by the topology of the network. For example, the ranking function using the votes described above may be less effectual in an intranet setting. An intranet is a network that uses some of the same protocols as the Internet, but is accessible only by a subset of users, such as employees of a corporation. The pages of an intranet are not structured or connected exactly like the Internet, and so the relevancy of the results produced by a ranking function may not be reduced as compared to the Internet setting.

SUMMARY OF THE INVENTION

Embodiments of the present invention are related to a system and method for ranking search results according to a new function referred to as click distance. The click distance function takes advantage of the hierarchical structure of an intranet. An intranet usually follows a tree structure, with a root node and subsequent branches extending to other nodes from that root. Often the root node of the intranet is referred to as its homepage. Other sites outside of the intranet setting may also be based on a hierarchical structure, and click distance for these sites would also be highly applicable for ranking the site's pages.

Click distance is a query-independent relevance measure that measures the number of "clicks" required to reach a given page of the site. In the tree structure, the number of clicks is represented by the number of branches traversed on the path from the root node. Once the click distance is determined for a page, the click distance is incorporated into the score for the page. The page's score incorporating the click distance determines the page's rank among the other pages within the search results.

In one aspect of the present invention, the network is first "crawled" to generate a table of properties associated with the links and pages of the network. "Crawling" refers to automatically collecting several documents (or any analogous discrete unit of information) into a database referred to as an index. Crawling traverses multiple documents on the network by following document reference links within certain documents, and then processing each document as found. The documents are processed by identifying key words or general text in the documents to create the index.

An exemplary index can be an inverted list that has a column of words and a column indicating in which documents those words can be found. When a user enters in one or more search terms, the results are obtained and the present invention applies a ranking algorithm that includes the click distance function. The click distance function positively or negatively affects the score of certain pages, refining the results returned to the user.

In another aspect of the invention, a URL (Uniform Resource Locator) depth property is added to the ranking algorithm to further refine the results. The URL depth property measures the number of levels in the URL to provide a check against the click distance function and adjust the page's score accordingly.

DETAILED DESCRIPTION

The present invention now will be described more fully hereinafter with reference to the accompanying drawings, which form a part hereof, and which show, by way of illustration, specific exemplary embodiments for practicing the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Illustrative Operating Environment

Figure 1:
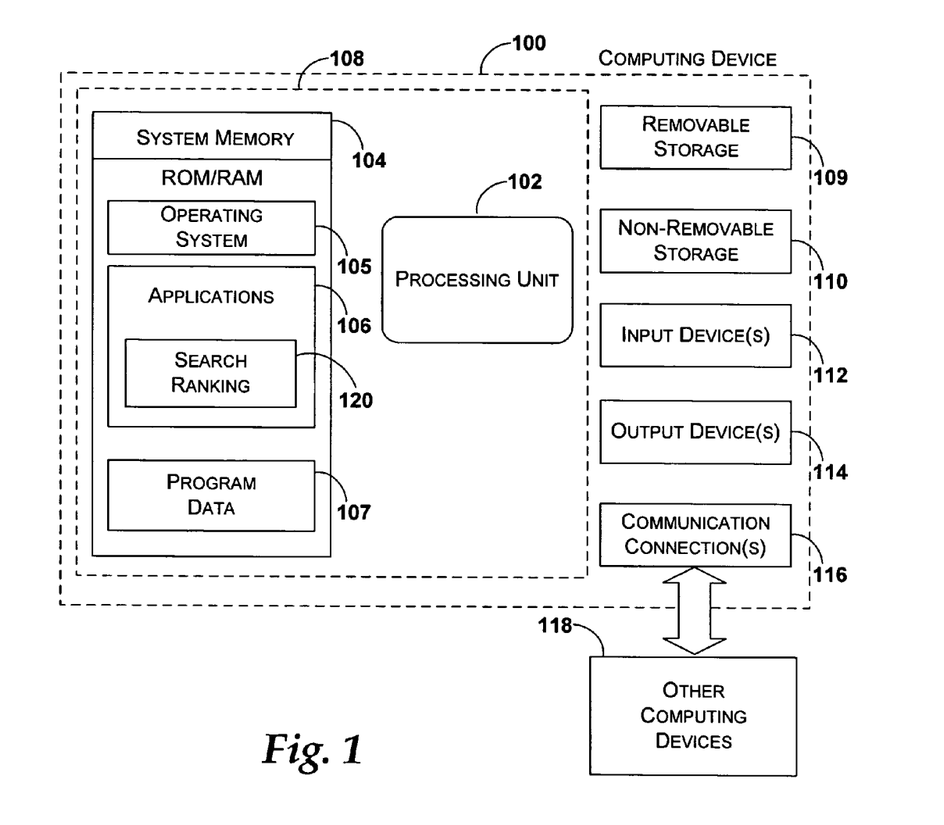
FIG. 1 illustrates an exemplary computing device that may be used in one exemplary embodiment of the present invention.

With reference to FIG. 1, one exemplary system for implementing the invention includes a computing device, such as computing device 100. Computing device 100 may be configured as a client, a server, mobile device, or any other computing device. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 includes a search ranking application 120 for implementing the functionality of the present invention. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Illustrative Embodiments for Ranking Searches by Click Distance

Embodiments of the present invention are related to a ranking function for a search engine. The quality of a search engine is typically determined by the relevance of the documents according to the ranks assigned by the ranking function. The ranking function can be based on multiple features. Some of these features may depend on the query, while others are considered query independent. This invention utilizes a query-independent measure of relevance referred to as click distance Click distance is the number of "clicks" a user will have to do from the homepage of the intranet (the most authoritative URL on the intranet, or one of the most authoritative URLs) to the given page. On a web graph, the click distance can be represented as the shortest path between the homepage and the given page. In one embodiment, an algorithm performs breadth first traversal and computes distance between a given node to all other nodes in the graph. The traversal can take N iterations to complete, where N is the diameter of the graph (maximum shortest distance), to compute click distance for the intranet. The variable N in this case is much smaller than the total number of nodes on the graph. For example, N for the present invention may be between 5 and 60 depending on the network. Other ranking functions can require 40-50 iterations to cover the graph (e.g., page rank), causing the other ranking functions to be several times slower than using click distance.

Figure 2:
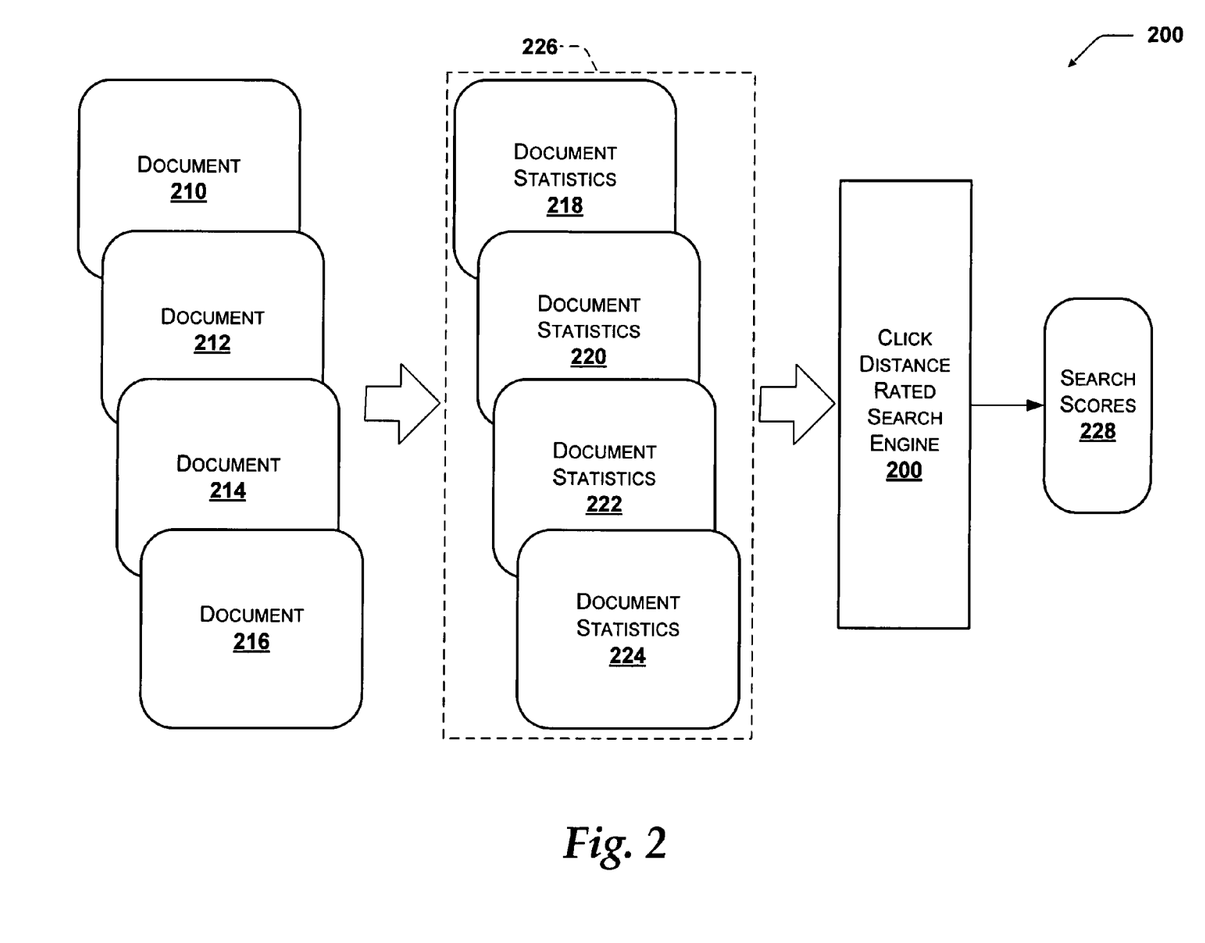
FIG. 2 illustrates a system for ranking search results according to click distance in accordance with the present invention.

FIG. 2 illustrates a system for ranking search results according to click distance in accordance with the present invention. The search engine 200 receives a query containing multiple query terms. Each query term may include multiple component terms, such as when the query term is a phrase (e.g., the phrase "document management system" may be considered a single query term"). In addition, a query may include one or more operators, such as Boolean operators, constraints, etc., which are commonly supported by known search engines.

A plurality of documents on a distributed network, represented by documents 210, 212, 214, and 216, are available for searching. In practice, a search engine may search any number of documents and typically search collections containing large numbers (e.g., millions) of documents. The volume of documents may be reduced from the Internet setting to the intranet setting, but the reduction is usually from billions to millions so that the relative number documents is still quite large. An indexing module (not shown) generates individual document statistics (e.g., 218, 220, 222, and 224) for each document. The document statistics are stored in an index 226.

Search engine 200 consults index 226 to determine a search score 228 for each document based on the query and the corresponding document statistics. In the present invention, one of the documents statistics included is the click distance of the document. In another embodiment, another document statistic included is the URL depth associated with the document. Click distance and URL depths are then combined with query dependent statistics to form a document's final score. Typically, document scores 228 are then ranked in descending order to give the user a list of documents that are considered by the search algorithm to be most relevant to the query.

In the illustrated system, the search engine 200 represents a click distance ranking search engine, which considers the click distance of a document in determining the document's search score. Click distance rating of a document leverages the presence of the document in a hierarchically structured site (see FIG. 3), measuring the distance from the site's homepage to the document. In one instance, the click distance from the homepage is a measure of the importance of the page, where pages closer in the hierarchy to the homepage are considered more important than the pages lower in the hierarchy. However, other scenarios may exist where the opposite holds true, where documents lower in the hierarchy are considered more than those pages higher in the hierarchy. Click distance is therefore considered a query-independent relevance measure since it rates the document's importance overall rather than according to the query (e.g., a query-dependent ranking function would be counting the number of times a search term appears in a document).

Figure 3:
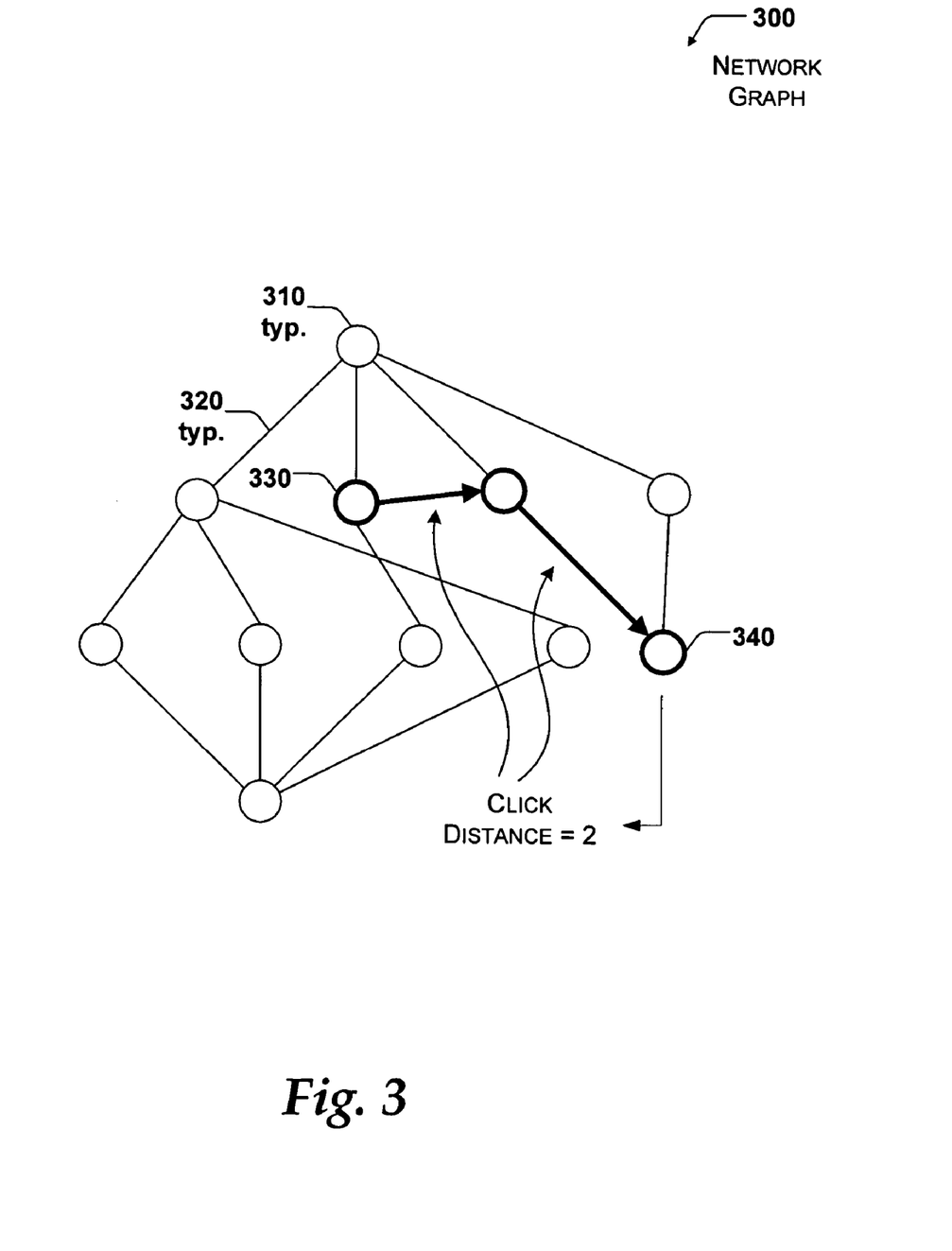
FIG. 3 illustrates an exemplary network graph in accordance with the present invention.

FIG. 3 illustrates an exemplary network graph in accordance with the present invention. The network graph is comprised of nodes (e.g., 310) and edges or links (e.g., 320). The nodes (e.g., 310) represent the pages and other resources that are on the network that may be returned as results to a search query. The links (e.g., 320) connect each one of these pages together through the use of navigation links listed on the pages. A set of link information may be gathered for each page that can be used in calculating the click distance for a particular page.

In one embodiment, node 330 represents the highest authority page or root node on the network for a group of documents. The click distance for the remaining pages of the network may be calculated from node 330. For example, node 340 has a click distance of two "clicks" from node 330. As stated above, "clicks" refers to the number of branches traversed on the shortest path from the highest authority node. Other paths from node 330 could have been chosen to reach node 340, but click distance is concerned with the shortest path.

Network graph 300 is shown with nodes that do not conform to a particular order, and may be similar to the Internet in that aspect. With the lack of order, the applicability of click distance for ranking pages may be difficult to conceptualize. However, often the network of pages and resources does conform to an applied order as shown in FIG. 4 below.

Figure 4:
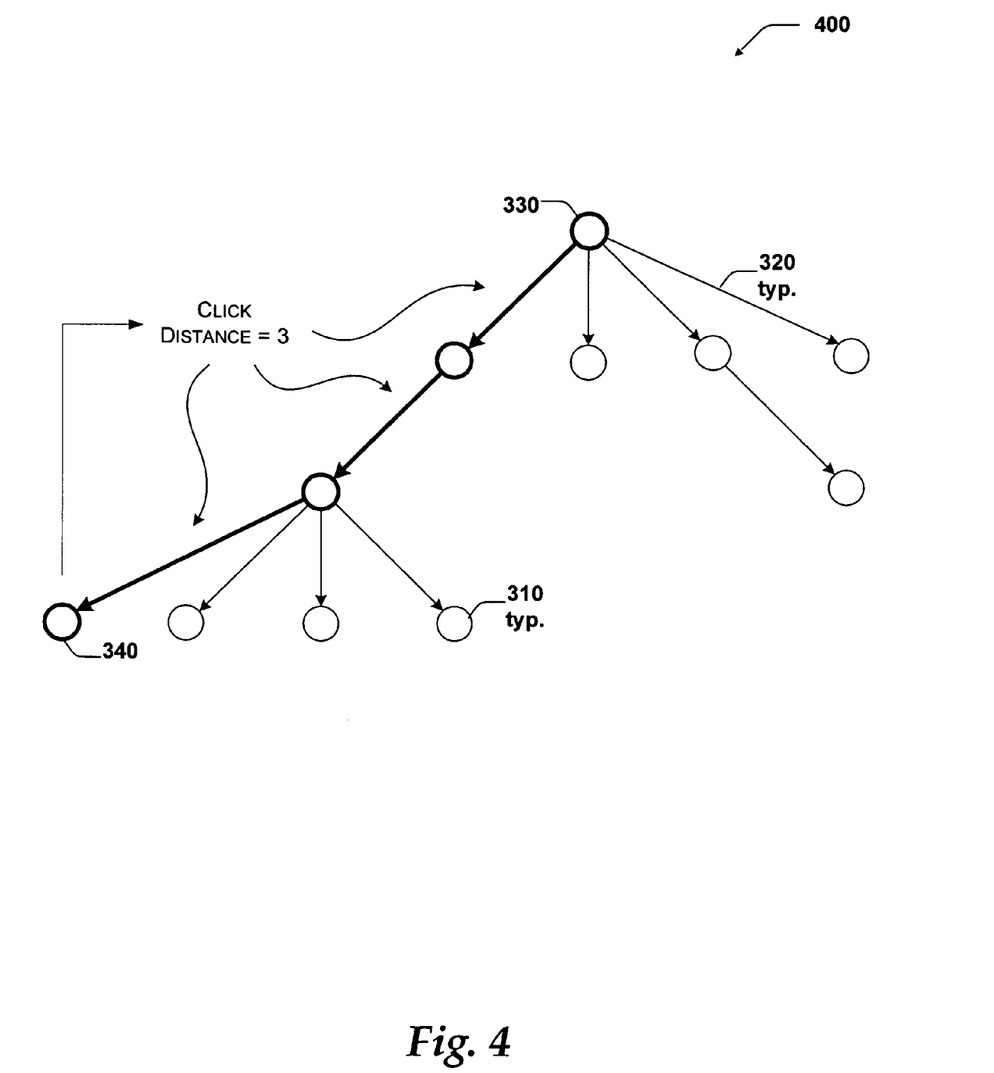
FIG. 4 illustrates an exemplary hierarchical network graph in accordance with the present invention.

FIG. 4 illustrates an exemplary hierarchical network graph in accordance with the present invention. Hierarchical network graph 400 is similar to network graph 300 shown in FIG. 3 in that it also includes nodes (e.g., 410) and links (e.g., 420). However, hierarchical network graph 400 is based on the inherent hierarchy of a structured site or intranet. Accordingly, hierarchical network graph 400 may be conceptualized as a tree structure with branches extending from a root node.

For hierarchical network graph 400, the applicability and calculation of click distance is more recognizable. For example, node 330 corresponds to the highest authority node or root node of the tree. Node 340 therefore has an associated click distance of 3, being 3 clicks or user navigations from the root node. Stated differently, since a user is required to traverse 3 branches of the tree to navigate from node 330 to node 340, the click distance is also 3.

The network graphs represented in FIGS. 3 and 4 are examples of graphs that are constructed in memory during the indexing of the documents for calculating the click distance. Constructing a graph during indexing allows the click distance to be included among the document statistics stored in the index and used for ranking the pages. Example processes for generating the click distance property and using the click distance property in ranking documents are described below in relation to FIGS. 5 and 6.

Figure 5:
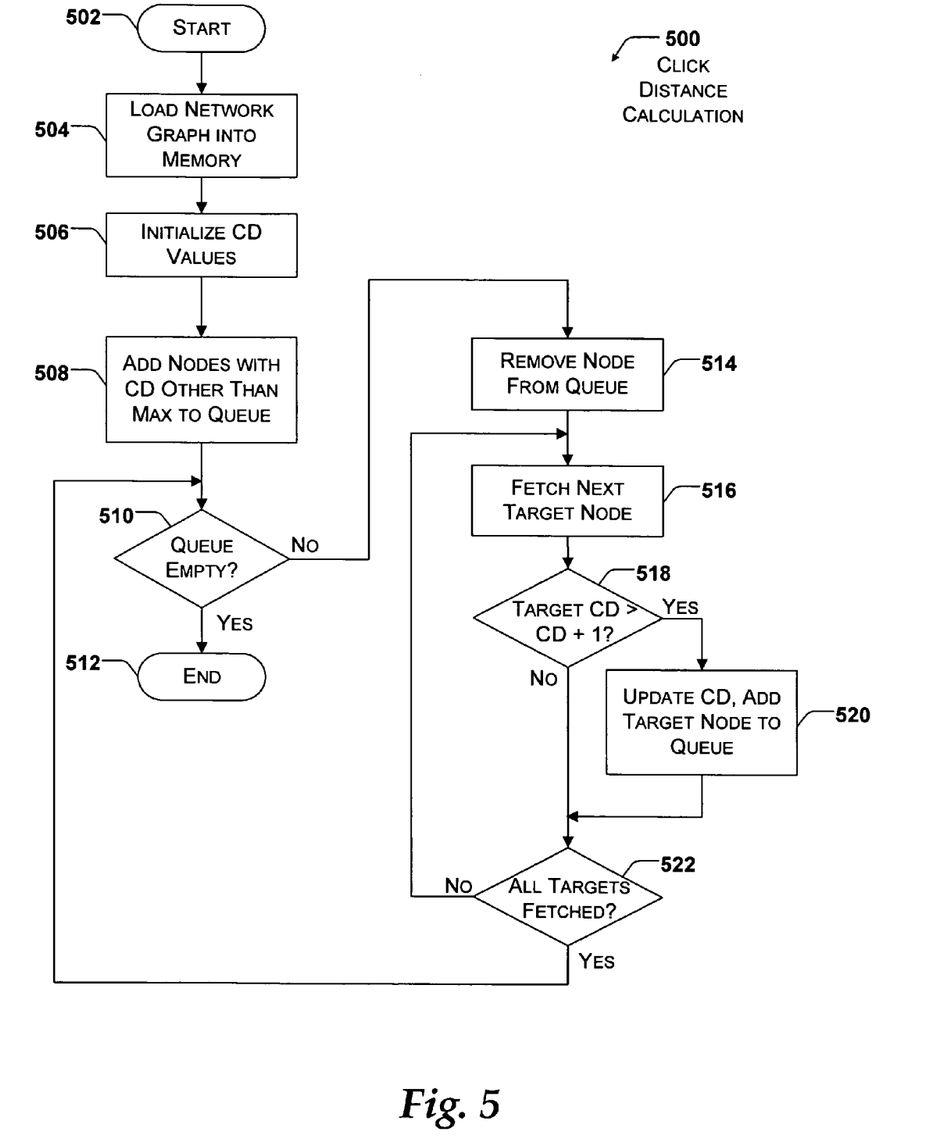
FIG. 5 illustrates a logical flow diagram of an exemplary process for calculating the click distance in accordance with the present invention.

FIG. 5 illustrates a logical flow diagram of an exemplary process for calculating the click distance (CD) in accordance with the present invention. Process 500 starts at block 502 where documents on a distributed network have been indexed and the network graph has been generated. In one embodiment, network graph is generated from data gathered by a process where link and anchor text information is gathered and attributed to specific target documents of the anchor. This process and the concept of anchor text is described more fully in a patent application having Ser. No. 10,955,462, entitled: "System and Method for Incorporating Anchor Text into Ranking Search Results", filed concurrently with this application that is hereby incorporated by reference. Processing continues at block 504.

At block 504, the network graph is loaded into memory. This network graph is the structural representation of the document identification (e.g., document ID) and linking information gathered from the network. Examples of the network graph are shown in FIGS. 3 and 4. The network graph represents the nodes or pages of a site or intranet. Each node has an associated click distance property that has a value or weight. In one embodiment, this click distance property is concatenated onto the end of the document ID. Processing continues at block 506.

At block 506, click distance (CD) values for the nodes are initialized. The highest authority nodes are referred to as assigned nodes. These nodes are assigned a click distance value of 0 (zero). More than one high authority node may be designate for a single network graph. For example, an administrator may rank a set of 100 nodes manually and designate them all as high authority nodes. Additionally, high authority nodes do not need to have a click distance of 0 (zero), any number may be assigned by an administrator. Changing the click distance of the high authority nodes does not alter the remaining algorithm, but simply provides a method for manually designating the importance of a node. For example, an administrator can improve the click distance score of some nodes. In other cases the administrator can decrease the click distance score (by forcing click distance to be higher than computed by the algorithm by default). The click distance for each of the unassigned nodes is initialized to a maximum value. In one embodiment, the maximum value essentially sets the click distance value to infinity. Assigning the infinity value to a node makes it easily recognizable as a node that has not had its click distance calculated. With the initializations of the click distance values complete, processing moves to block 508.

At block 508, the nodes that have an associated click distance other than the maximum value are inserted into a queue. In one example, this step only occurs in a first iteration. The nodes inserted into the queue correspond to the highest authority nodes since their click distance values are set to 0 (zero), a value other than the maximum value. Once the nodes with click distance value other than the maximum are added to the queue, processing continues at decision block 510.

At decision block 510, a determination is made whether the queue is empty. An empty queue signifies that no more nodes need the click distance of their target nodes calculated. If the queue is empty, processing moves to block 512 where process 500 ends. However, if the queue is not empty, processing continues at block 514.

At block 514, a node is removed from the queue. Removing the node from the queue initiates the calculation of the click distances for the target nodes associated with that document. Target nodes correspond to documents that have a link to them from an originating document. In this case, the originating document is the document corresponding to the node removed from the queue. Once this node is removed, processing moves to block 516.

At block 516, the next target node is fetched. The next target node refers the next document among the documents linked to by the originating document. Once the next target node is fetched, processing continues to decision block 518.

At decision block 518, a determination is made whether the click distance associated with the target node is greater than the click distance of the current page plus one (CD+1). In one embodiment, the only way the condition in block 518 is met is when the target node has a click distance of infinity (assuming that the high authority node is set to zero and an administrator has not manually set a click distance). For example, if the current click distance is 1, then CD+1=2. A click distance of 2 is less than infinity and the condition is met. Determining whether the target click distance is greater than the click distance plus one prevents target documents with a lower click distance from being changed. Using the previous example, if the click distance of the target node is 1, and the current click distance is also 1, then the target click distance is not greater than CD+1=2. In this instance, the shorter path to the target node has already been recorded and therefore need not be updated. Accordingly, when the target click distance is not greater than the current click distance plus one, processing advances to decision block 522. However, if the target click distance is greater than the current click distance plus one, processing moves to block 520.

At block 520, the click distance value of the target node is updated and the target node is added to the queue as a node where click distance calculation of its targets needs to be done. The target node is updated with a new click distance value to remove the infinity value and set the nodes calculated click distance value. In one embodiment, the click distance value of the node is set to the current click distance value plus one (CD+1). Processing continues at decision block 522.

At decision block 522, a determination is made whether all the target nodes have been fetched for the current node removed from the queue. If there are target nodes left to fetch for the current node, processing returns to block 516 where the next target node is fetched. However, if all the target nodes corresponding to the current node have been fetched, processing returns to decision block 510 to recheck if the queue is now empty. Again, once the queue is empty, processing moves to block 512, where process 500 ends.

It is possible that not all of the nodes in a network are connected to the initial high authority nodes. Accordingly, in another embodiment of the present invention, the nodes that are not connected to the high authority nodes are assumed to have a low importance and are assigned a click distance that is less than average for the network graph.

Figure 6:
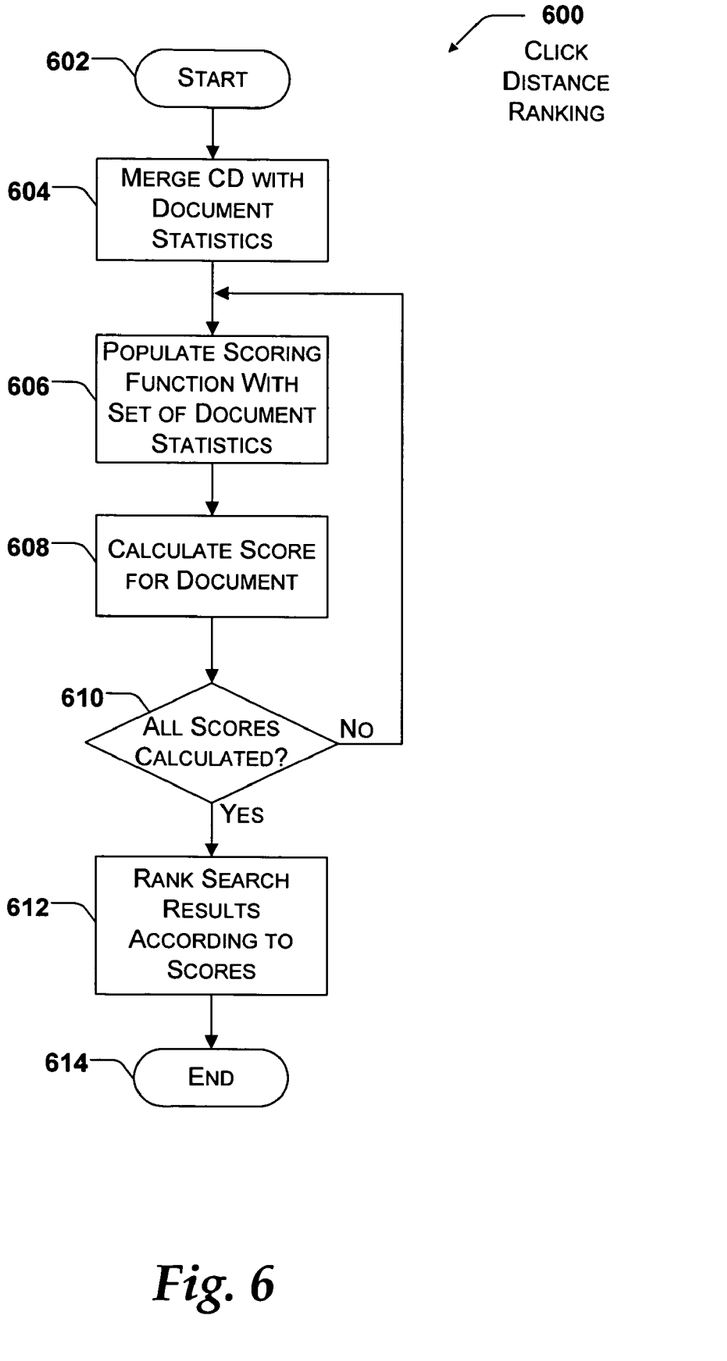
FIG. 6 illustrates a logical flow diagram of an exemplary process for using the click distance in ranking search results in accordance with the present invention.

FIG. 6 illustrates a logical flow diagram of an exemplary process for using the click distance in ranking search results in accordance with the present invention. Process 600 starts at block 602 where a query has been requested and the click distance for each of the documents on the network has been calculated. Processing continues at block 604.

At block 604, the click distance value for each of the documents is merged with the other document statistics (see FIG. 2) in the index. Merging the click distance values with the other document statistics allows for a faster query response time since all the information related to ranking is clustered together. Accordingly, each document listed in the index has an associated click distance value after the merge. Once the merge is complete, processing moves to block 606.

At block 606, a scoring function is populated with the set of document statistics, including the click distance, to calculate a score for a particular document. The click distance provides a query-independent factor to the scoring function. The other portion of the scoring function corresponds to the query-dependent or content-related portion of the scoring function. In one embodiment, the scoring function is a sum of query-dependent (QD) and query-independent (QID) scoring functions:

$$\text{Score} = QD(doc, query) + QID(doc) \quad (1)$$

The QD function can be any document scoring function. In one embodiment, the QD scoring function corresponds to the field weighted scoring function described in patent application Ser. No. 10/804,326, entitled "Field Weighting in Text Document Searching", filed on Mar. 18, 2004 and hereby incorporated by reference. As provided by the Ser. No. 10/804,326 patent application the following is a representation of the field weighted scoring function:

$$QD(doc, query) = \sum \frac{wtf(k_1 + 1)}{k_1\left((1-b) + b\frac{wdl}{avwdl}\right) + wtf} \times \log\left(\frac{N}{n}\right) \quad (2)$$

Wherein the terms are defined as follows: wtf is the weighted term frequency or sum of term frequencies of a given terms multiplied by weights across all properties; wdl is the weighted document length; avwdl is the average weighted document length; N is the number of documents on the network (i.e., the number of documents crawled); n is the number of documents containing the given query term; and $k_1$ and b are constants. These terms and the equation above are described in detail in the Ser. No. 10/804,326 patent application.

The QID function can be any transformation of click-distance and other document statistics (such as URL depth). In one embodiment this function is as follows:

$$QID(doc) = \sum w_{cd} \frac{k_{cd}}{k_{cd} + \frac{b_{cd}CD + b_{ud}UD}{b_{cd} + b_{ud}}} \quad (3)$$

Wherein the terms for the function are defined as follows: $w_{cd}$ is the weight of the query independent component; $b_{cd}$ is the weight of the click distance; $b_{ud}$ is the weight of the URL depth; CD is the Click Distance; UD is the URL Depth; and $K_{cd}$ is the click distance saturation constant. The weighted terms ($w_{cd}$, $b_{cd}$, and $b_{ud}$) assist in defining the importance of each of their related terms and ultimately the shape of the scoring functions. The URL depth (UD) is an addition to the query-independent component to smooth the effect of the click distance on the scoring function. In some cases, a document that is not very important (i.e., has a large URL depth) may have a short click distance. The URL depth counts the number of slashes in a document's URL. For example, www.example.com\d1\d2\d3\d4.htm includes four slashes and would therefore have a URL depth of 4. This document however, may have a link directly from the main page www.example.com giving it a click distance of 1. Including the URL depth term in function (3) and weighting it against the click distance, compensates for the high click distance score to more accurately reflect the page's rank within the hierarchy. Depending on the network, a URL depth of 3 or more may be considered a deep link. For this embodiment, the present invention adds the two functions of (2) and (3) to receive the scoring function (Score), such that the new scoring function becomes:

$$Score = \sum \frac{wtf(k_1+1)}{k_1\left((1-b)+b\frac{wdl}{avwdl}\right)+wtf} \times \log\left(\frac{N}{n}\right) + \qquad (4)$$

$$w_{cd}\frac{k_{cd}}{k_{cd}+\frac{b_{cd}CD+b_{ud}UD}{b_{cd}+b_{ud}}}$$

In other embodiments, the URL depth may be removed from the scoring function or other factors may be added to the scoring function to improve the accuracy of either the query-dependent or query-independent component. Furthermore, the query-independent component may be incorporated into other ranking functions not shown for improvement of the ranking results without departing from the spirit or scope of the invention. Once scoring function (4) is populated with the document statistics for a particular document, processing proceeds to block 608.

At block 608, the scoring function is executed and the relevance score for the document is calculated. Once the relevance score is calculated, it is stored in memory and associated with that particular document. Processing then moves to decision block 610.

At decision block 610, a determination is made whether relevance scores for all the documents have been calculated according to scoring function (4). The scores may be calculated serially as shown or in parallel. If all the scores have not been calculated, processing returns to block 606 where the scoring function is populated with the next set of document statistics. However, if the all the scores have been calculated, processing continues to block 612.

At block 612, the search results of the query are ranked according to their associated scores. The scores now take into account the click distance and URL depth of each of the documents. Accordingly, the ranking of the documents has been refined so that documents higher in the hierarchy of an intranet or site are ranked higher the other documents where all other factors are the same. Once the search results are ranked, processing proceeds to block 614, where process 600 ends.

After process 600 is complete, the ranked documents may be returned to the user by the various operations associated with the transmission and display of results by a search engine. The documents corresponding to the higher precision results may then be selected and viewed at the user' discretion.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A system for ranking search results, comprising a search engine on a computing device, the search engine configured to execute computer-executable instructions, which when executed by the computing system cause the computing system to perform a method comprising:
   discovering a plurality of documents on a network;
   recording document and link information for each of the plurality of documents on the network;
   generating a representation of the network from the document and link information, wherein the representation of the network includes a plurality of nodes, each document being represented by one of the plurality of nodes;
   receiving manually input click distances designating a subset of the plurality of nodes as highest authority nodes, the subset of the plurality of nodes including at least a first highest authority node and a second highest authority node, wherein the manually input click distances indicate a relative importance of each highest authority node with respect to other highest authority nodes;
   initializing click distances for a second subset of the plurality of nodes to a maximum value, the second subset of the plurality of nodes not including highest authority nodes and comprising at least a first non-highest authority node and a second non-highest authority node;
   computing click distances for the first and second non-highest authority nodes by:
      determining a first click distance for the first non-highest authority node, the first click distance being a first number of branches traversed on a first shortest path between the first non-highest authority node and the first highest authority node;
      determining a second click distance for the first non-highest authority node, the second click distance being a second number of branches traversed on a second shortest path between the first non-highest authority node and the second highest authority node;
      determining a third click distance for the second non-highest authority node, the third click distance being a third number of branches traversed on a third shortest path between the second non-highest authority node and the first highest authority node; and
      determining a fourth click distance for the second non-highest authority node, the fourth click distance being a fourth number of branches traversed on a fourth shortest path between the second non-highest authority node and the second highest authority node;
   storing the first, second, third, and fourth click distances in memory, such that the first and second click distances are associated with a first document, and the third and fourth click distances are associated with a second document;
   calculating search rank results using at least one of the first, second, third, and fourth click distances associated with each of the first and second documents as a query-independent relevance measure in ranking the plurality of documents; and
   storing search rank results in memory, wherein the search rank results comprise a list of documents arranged in a descending order of relevance.

2. The system of claim 1 wherein generating a representation of the network further comprises generating a network graph and storing the network graph into the memory.

3. The system of claim 1 wherein computing click distances further comprises merging the first, second, third, and fourth click distances into an index that includes one or more other ranking values that correspond to each of the first and second documents.

4. The system of claim 3 further comprising populating a scoring function with the first, second, third, and fourth click distances and the one or more other ranking values for producing a score by which the first and second documents are ranked.

5. The system of claim 1 wherein calculating search rank results using at least one of the click distances associated with each of the first and second documents as a query-independent relevance measure further comprises using a component corresponding to the first, second, third, and fourth click distances in a scoring function for determining a relevance score for each of the documents.

6. The system of claim 5 wherein the relevance score is offset by a Uniform Resource Locator depth property that smoothes an effect of a click distance on the scoring function when a click distance for a node is disproportionate to a depth of the node in the representation of the network.

7. The system of claim 1 wherein calculating the search rank results further comprises ranking the first and second documents according to a scoring function (score) that is determined according to at least: the at least one of the click distances associated with each of the first and second documents (CD), a weight of a query-independent component ($W_{cd}$), a weight of the click distance ($b_{cd}$), a weight of a URL depth ($b_{ud}$), the URL depth (UD) and a click distance saturation constant ($K_{cd}$).

8. The system of claim 1 wherein calculating the search rank results further comprises ranking the first and second documents according to a scoring function (score) that is determined according to at least: the at least one of the click distances associated with each of the first and second documents (CD), a weighted term frequency (wtf), a weighted document length (wdl), an average weighted document length (avwdl), a number of documents on the network (N); a number of documents containing a query term (n), a weight of a query-independent component ($W_{cd}$), a weight of the click distance ($b_{cd}$), a weight of a URL depth ($b_{ud}$), the URL depth (UD), a click distance saturation constant ($K_{cd}$) and other constant ($k_1$,b).

9. The system of claim 8 wherein the scoring function (score) is given by:

$$score = \sum \frac{wtf(k_1+1)}{k_1\left((1-b)+b\frac{wdl}{avwdl}\right)+wtf} \times \log\left(\frac{N}{n}\right) + w_{cd}\frac{k_{cd}}{k_{cd}+\frac{b_{cd}CD+b_{ud}UD}{b_{cd}+b_{ud}}}.$$

10. The system of claim 1 further comprising: allowing the at least one of the click distances associated with each of the first and second documents to be manually changed.

11. A method for ranking search results, the method comprising:
    discovering a plurality of documents stored on one or more computing devices in a network of computing devices;
    recording document and link information for each of the plurality of documents;
    generating a representation of the network from the document and link information, wherein the representation of the network includes a plurality of nodes, each document being represented by one of the plurality of nodes;
    receiving manually input click distances designating a subset of the plurality of nodes as highest authority nodes, the subset of the plurality of nodes including at least a first highest authority node and a second highest authority node, wherein the manually input click distances indicate a relative importance of each highest authority node with respect to other highest authority nodes;
    initializing click distances for a second subset of the plurality of nodes to a maximum value, the second subset of the plurality of nodes not including the highest authority nodes and comprising at least a first non-highest authority node and a second non-highest authority node;
    computing click distances for the first and second non-highest authority nodes by:
        determining a first click distance for the first non-highest authority node, the first click distance being a first number of branches traversed on a first shortest path between the first non-highest authority node and the first highest authority node;
        determining a second click distance for the first non-highest authority node, the second click distance being a second number of branches traversed on a second shortest path between the first non-highest authority node and the second highest authority node;
        determining a third click distance for the second non-highest authority node, the third click distance being a third number of branches traversed on a third shortest path between the second non-highest authority node and the first highest authority node; and
        determining a fourth distance for the second non-highest authority node, the fourth click distance being a fourth number of branches traversed on a fourth shortest path between the second non-highest authority node and the second highest authority node;
    storing the first, second, third, and fourth click distances in memory on a computing device in the network, such that the first and second click distances are associated with a first document, and the third and fourth click distances are associated with a second document;
    calculating search rank results using at least one of the first, second, third, and fourth click distances associated with each of the first and second documents as a query-independent relevance measure in ranking the plurality of documents; and
    storing the search rank results in the memory on the computing device.

12. The method of claim 11, wherein generating a representation of the network further comprises generating a network graph and storing the network graph into the memory.

13. The method of claim 11 wherein computing the first, second, third, and fourth click distances further comprises merging the first, second, third, and fourth click distances into an index that includes one or more other ranking values that correspond to each of the first and second documents.

14. The method of claim 13 further comprising populating a scoring function with first, second, third, and fourth click distances and the one or more other ranking values for producing a score by which the first and second documents are ranked.

15. The method of claim 11 wherein calculating search rank results using at least one of the click distances associated with each of the first and second documents as a query-independent relevance measure further comprises using a component corresponding to the first, second, third, and fourth click distances in a scoring function for determining a relevance score for each of the documents.

16. The method of claim 11 wherein the relevance score is offset by a Uniform Resource Locator depth property that smoothes an effect of a click distance on the scoring function when a click distance for a node is disproportionate to a depth of the node in the representation of the network.

17. The method of claim 11, wherein calculating the search rank results further comprises ranking the first and second documents according to a scoring function (score) that is determined according to at least: the at least one of the click distances associated with each of the first and second documents (CD), a weight of a query-independent component ($W_{cd}$), a weight of the click distance ($b_{cd}$), a weight of a URL depth ($b_{ud}$), the URL depth (UD) and a click distance saturation constant ($K_{cd}$).

18. The method of claim 11 wherein calculating the search rank results further comprises ranking the first and second documents according to a scoring function (score) that is determined according to at least: the at least one of the click distances associated with each of the first and second documents (CD), a weighted term frequency (wtf), a weighted document length (wdl), an average weighted document length (avwdl), a number of documents on the network (N); a number of documents containing a query term (n), a weight of a query-independent component ($W_{cd}$), a weight of the click distance ($b_{cd}$), a weight of a URL depth ($b_{ud}$), the URL depth (UD), a click distance saturation constant ($K_{cd}$) and other constant ($k_1$,b).

19. The method of claim 18 wherein the scoring function (score) is given by:

$$score = \sum \frac{wtf(k_1+1)}{k_1\left((1-b)+b\frac{wdl}{avwdl}\right)+wtf} \times \log\left(\frac{N}{n}\right) + w_{cd}\frac{k_{cd}}{k_{cd}+\frac{b_{cd}CD+b_{ud}UD}{b_{cd}+b_{ud}}}.$$

20. The method of claim 11 further comprising: allowing the at least one of the click distances associated with each of the first and second documents to be manually changed.

* * * * *

UNITED STATES PATENT AND TRADEMARK OFFICE
CERTIFICATE OF CORRECTION

PATENT NO. : 7,761,448 B2  
APPLICATION NO. : 10/955983  
DATED : July 20, 2010  
INVENTOR(S) : Dmitriy Meyerzon et al.

Page 1 of 1

It is certified that error appears in the above-identified patent and that said Letters Patent is hereby corrected as shown below:

In column 12, line 18, in Claim 11, after "fourth" insert -- click --.

In column 12, line 51, in Claim 15, delete "11" and insert -- 11, -- therefor.

In column 12, line 58, in Claim 16, delete "11" and insert -- 15, -- therefor.

In column 14, line 13, in Claim 20, delete "11" and insert -- 11, -- therefor.

Signed and Sealed this  
Twenty-fourth Day of May, 2011

David J. Kappos  
*Director of the United States Patent and Trademark Office*